US012647182B2

(12) United States Patent
Van Wageningen

(10) Patent No.: US 12,647,182 B2
(45) Date of Patent: Jun. 2, 2026

(54) FLEXIBLE BACKBONE NETWORK FOR HIGH-SPEED OPTICAL WIRELESS COMMUNICATION

(71) Applicant: SIGNIFY HOLDING B.V., Eindhoven (NL)

(72) Inventor: Andries Van Wageningen, Wijlre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 282 days.

(21) Appl. No.: 18/686,908

(22) PCT Filed: Aug. 22, 2022

(86) PCT No.: PCT/EP2022/073271
§ 371 (c)(1),
(2) Date: Feb. 27, 2024

(87) PCT Pub. No.: WO2023/025701
PCT Pub. Date: Mar. 2, 2023

(65) Prior Publication Data
US 2025/0132831 A1       Apr. 24, 2025

(30) Foreign Application Priority Data
Aug. 27, 2021    (EP) ..................................... 21193416

(51) Int. Cl.
*H04B 10/112*       (2013.01)
*H04B 10/116*       (2013.01)
*H04B 10/27*        (2013.01)
(52) U.S. Cl.
CPC ....... *H04B 10/1123* (2013.01); *H04B 10/116* (2013.01); *H04B 10/271* (2013.01)
(58) Field of Classification Search
None
See application file for complete search history.

(56) References Cited

U.S. PATENT DOCUMENTS

| | | | | |
|---|---|---|---|---|
| 6,195,044 B1 * | 2/2001 | Fowell | ................... | G01S 5/163 |
| | | | | 398/9 |
| 2002/0109884 A1 * | 8/2002 | Presley | .............. | H04B 10/1125 |
| | | | | 398/140 |

(Continued)

FOREIGN PATENT DOCUMENTS

| | | |
|---|---|---|
| WO | 2002073835 A1 | 9/2002 |
| WO | 2020169378 A1 | 8/2020 |
| WO | 2020188290 A2 | 9/2020 |

OTHER PUBLICATIONS

URL: https://www.hyperiontechs.com/product/small-cell-backhaul-fso-10-gbps-autonomous-compact-mesh-network/, Hyperion Technologies, Small Cell Backhaul FSO, Last Retrieved on Mar. 4, 2020 (3 Pages).

(Continued)

*Primary Examiner* — Darren E Wolf

(57)       ABSTRACT

A backbone network (100) for use in an optical wireless communication system comprises one or more local switches (200) and one or more optical access points (300), APs, wherein local switches (200) are configured to provide to optical APs (300) connections to an external network. Each local switch (200) comprises a first type optical front end (210), OFE, having a rotatable orientation and a beam angle not larger than 60 degrees, and a second type OFE (230) having a 360-degree beam angle on the rotation plane of the first type OFE. Each optical AP comprises an OFE (310) having a rotatable orientation and a beam angle not larger than 60 degrees. The pairing and beam alignment between the first type OFE of a local switch and the OFE of an optical AP is achieved via the assist of the second type OFE of the local switch.

14 Claims, 4 Drawing Sheets

(56) References Cited

U.S. PATENT DOCUMENTS

| | | | |
|---|---|---|---|
| 2002/0131121 A1* | 9/2002 | Jeganathan ........ | H04B 10/1127 |
| | | | 398/118 |
| 2007/0031151 A1* | 2/2007 | Cunningham ..... | H04B 10/1123 |
| | | | 398/131 |
| 2007/0297808 A1* | 12/2007 | Pavelchek .......... | H04B 10/1123 |
| | | | 398/158 |
| 2022/0166506 A1* | 5/2022 | Carraro ................. | H05B 47/19 |

OTHER PUBLICATIONS

Shen, Thomas C., et al., Design of Dual-Link (Wide- and Narrow Beam) LED Communication Systems, Optical Society of America, Optics Express, vol. 22., No. 9, May 2014 (12 Pages).

* cited by examiner

600

800

FLEXIBLE BACKBONE NETWORK FOR HIGH-SPEED OPTICAL WIRELESS COMMUNICATION

CROSS-REFERENCE TO PRIOR APPLICATIONS

This application is the U.S. National Phase application under 35 U.S.C. § 371 of International Application No. PCT/EP2022/073271, filed on Aug. 22, 2022, which claims the benefit of European Patent Application No. 21193416.1, filed on Aug. 27, 2021. These applications are hereby incorporated by reference herein.

FIELD OF THE INVENTION

The invention relates to the field of optical wireless communication networks, such as Li-Fi networks. More particularly, various methods, apparatus, systems, and computer-readable media are disclosed herein related to a flexible backbone infrastructure to support high speed optical wireless communication.

BACKGROUND OF THE INVENTION

Recently, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points by spatially reusing the same bandwidth. These key advantages over wireless radio frequency communication make Li-Fi a promising secure solution to mitigate the pressure on the crowded radio spectrum for IoT applications and indoor wireless access. For industrial applications, further benefits of Li-Fi may include guaranteed bandwidth for a certain user, and the ability to function robustly in areas otherwise susceptible to electromagnetic interference. Therefore, Li-Fi is a very promising technology to enable the next generation of immersive connectivity.

High speed optical wireless communication provides a solution for communication between an access point (AP) to an end user. However, another problem to be solved is to deploy a flexible backbone infrastructure to enable the connections between APs and an external network, such as Ethernet. A structured backbone network may comprise a plurality of APs and a plurality of local switch nodes with each AP having a connection to a local switch node. The plurality of local switch nodes may connect to each other in a mesh topology, or in a centralized manner to a central switch node. Thus, different topologies are possible, such as a mesh topology, a tree topology, or a star topology.

US 2007297808A1 relates to a system and method for establishing and maintaining optical links between optical transceiver nodes in a free space optical communications network.

SUMMARY OF THE INVENTION

Considering that in an industrial environment the APs may be repositioned quite often, it is necessary to establish a flexible infrastructure, such that the connections between APs and switch nodes are based on high-speed optical wireless communication and the pairing between an AP and a switching node can be adjusted dynamically. In view of energy efficiency and communication distance to be supported, a high-speed optical wireless link is typically of a narrow beam angle that is less than 60 degrees, or even below 20 degrees. Such a narrow beam angle may result in a high overhead and a long latency to align the AP and a new local switch node when the AP is repositioned. Thus, the flexibility of the system may be reduced.

In view of the above, the present disclosure is directed to methods, apparatus, and systems for providing a solution to a fast alignment between an AP and a local switch node enabling a flexible backbone network. More particularly, the goal of this invention is achieved by a backbone network as claimed in claim 1, by a local switch as claimed in claim 8, by a method of a local switch as claimed in claim 13, and by a computer program as claimed in claim 14.

In accordance with a first aspect of the invention a local switch is provided. A local switch of a backbone network for use in an optical wireless communication, OWC, system, the local switch is configured to provide to a remote optical access point, AP, a connection to an external network. The local switch comprises: at least one first type optical front end, OFE, configured to transmit and/or receive with a beam angle not larger than 60 degrees, the first type OFE having an adjustable orientation for transmitting and/or receiving by rotating around a mechanical axis of the local switch, wherein an angle between the mechanical axis and an optical beam axis of the first type OFE is greater than 0 degree but smaller than 180 degrees; and a second type OFE configured to transmit and/or receive with a 360-degree beam angle on the rotation plane of the first type OFE; wherein the first type OFE supports higher data rate communication than the second type OFE, and the beam angle of the first type OFE is fully covered by the beam angle of the second type OFE; wherein each local switch is configured to: send a first signal with the second type OFE; detect a response to the first signal from a remote optical AP with the second type OFE; rotate the first type OFE, upon detecting the response by the second type OFE, for detecting the response with the first type OFE; fix the orientation of the first type OFE, upon detecting the response by the first type OFE, and send a confirmation signal to the remote optical AP with the first type OFE.

As one example, the backbone network may be of a tree topology, such that a local switch has a wired connection (e.g., a fiber optic connection) to the external network, and also high-speed optical wireless connections to one or more APs. It may also be possible that a plurality of local switches are connected to a central switch for an access to the external network. The central switch and the plurality of local switches are typically at fixed positions with wired connections. To allow a flexible and reconfigurable deployment of the optical wireless network, such as a Li-Fi network, the positions of the plurality of APs may be changed to satisfy certain application scenarios. Therefore, it is advantageous to equip the plurality of APs with only wireless interfaces (such as optical wireless connections with the local switches for a backbone connection and with one or more end devices for data communication).

The backbone connection between an AP and a local switch typically supports a data rate of a few hundred Mbps or even higher, in view of power efficiency a relatively narrow beam angle is desirable for such a connection. However, when the AP is repositioned, beam alignment between the AP and a new local switch also becomes more challenging. To address the problem of fast pairing and alignment between an AP and a local switch, the present invention discloses that a local switch comprises two types of optical front ends (OFEs) serving different purposes. The first type OFE has a relatively narrow beam angle but an adjustable orientation, which is mainly used for establishing a data link between the local switch and an AP. The second type OFE has a 360-degree beam angle that covers all the potential field of views (FoVs) of the first type OFE. The second type of OFE is mainly used for acquisition and possibly coarse alignment between the local switch and the AP.

In one example, a local switch may comprise more than one first type OFE for establishing narrow beam high-speed connections with more than one optical AP concurrently. The beam alignment procedures for the more than one optical AP may be carried out in parallel or sequentially.

An OFE comprises at least a light source and a light sensor, which implement the conversion between electrical signals and optical signals. In a transmitter chain, the OFE is used to convert an electrical transmitting signal to an output optical signal via the light source. In a receiver chain, the OFE is used to convert a received optical signal to an output electrical signal via the light sensor for further signal processing. A light source can be a Light-emitting diode (LED), a Laser diode (LD), a Vertical Cavity Surface Emitting Laser (VCSEL), or an array of LED, LD, or VESEL. A light sensor can be a photodiode, an avalanche diode, or another type of light sensor. Sometimes a light sensor is also called as a photo detector, a light detector, or a photo sensor. The first type OFE and the second type OFE may comprise different types of light sources for sending data and/or different types of light sensors for receiving data. It may also be an option that a same type of light source and/or light sensor are adopted by the first type OFE and the second type OFE, while the difference lies in the beam angle of the light source and the light sensor. Preferably, the same beam angle is supported by the light source and light sensor belonging to the same OFE, which is beneficial to a symmetrical bi-directional optical link.

Beam angle or beam width is the aperture angle from where most of the power is radiated. For example, the half power beam width is the angle between the half-power (−3 dB) points of the main lobe of the radiation pattern. For the horizontal plane, beam angle or beam width is usually expressed in degrees.

The first type OFE has a beam angle not larger than 60 degrees, preferably not larger than 30 degrees. Since the first type OFE is intended to establish a narrow point-to-point link, the beam angle of the first type OFE is preferably to be either 1 degree, 5 degrees, 10 degrees, 20 degrees, or 30 degrees. The selection of a beam angle may be dependent to the required data rate and communication distance. The higher the data rate or the larger the communication distance, the narrower the beam angle will be. In order to allow flexibility in beam alignment, the first type OFE has an adjustable orientation for transmitting and receiving by rotating around a mechanical axis of the local switch, the angle between the mechanical axis and an optical beam axis of the first type OFE is greater than 0 degree but smaller than 180 degrees. In one example, the angle is of 90 degrees, such that the mechanical axis of the local switch is perpendicular to the plane where the rotation angle of the first type OFE is located. The second type OFE has a 360-degree beam angle on the rotation plane of the first type OFE, which is intended to provide a full coverage for both emitting data to a potential AP and capturing data from the potential AP. The first type OFE and the second type OFE are placed in such a way that the beam angle of the first type OFE is fully covered by the beam angle of the second type OFE with each possible orientation of the first type OFE.

Note that the 360-degree beam angle of the second type OFE is not required to be omnidirectional in all three dimensions, but on the rotation plane of the first type OFE, such that covering all possible FoVs of the first type OFE when being oriented to different directions. The intention is to create a horizontal backbone with APs and local switches mainly located on the same plane (having about the same height to the floor). The positions of APs and local switches may possibly have some deviations from this plane, which may be overcome by the beam width in the direction perpendicular to this plane. Thus, the beam angles should be understood as such that when an OFE is placed in a cylinder with its mechanical axis aligned with the axis of the cylinder, the projection of a beam is a small band on the inside of a cylinder. The band created by the first type OFE with different orientations shall be fully covered with the other band created by the second type OFE.

To establish a new link with a potential AP, the local switch sends a first signal via the second type OFE. The first signal may be a beacon signal or an advertisement signal, which is used to announce the presence of a local switch and to invite a new AP to get connected. The first signal may be sent repeatedly within a certain time window, periodically, or according to a predefined schedule. And then, the second type OFE is configured to detect or to receive a response to the first signal. The response may be identified because of a predefined packet structure or information contained in the response. Upon the detection of the response, the local switch is aware of the presence of a new optical AP in the surrounding, and then the first type OFE may be activated for beam alignment to establish a high-speed link. The first type OFE is rotated to different orientations to detect the same response to the first signal as detected by the second type OFE. When the same response is also detected by the first type OFE, it indicates that first type OFE is aligned with the optical AP. And then the orientation of the first type OFE will be fixed. The first type OFE is further configured to send a confirmation signal to the optical AP, which is used to conclude the beam alignment procedure. And then, the first type OFE may start high-speed data communication with the optical AP in that fixed orientation.

Preferably, the first signal comprises an identifier of the local switch.

The identifier is used to uniquely identifying a certain local switch. When there are multiple local switches deployed in the area, it may also help a new optical AP to distinguish multiple first signals from one and another. Beneficially, the response to a first signal may also comprise the same identifier contained in a corresponding first signal.

In one setup, the second type OFE comprises a plurality of sub-OFEs, each having a different orientation with an individual beam angle, and the combined individual beam angles constitute the 360-degree beam angle of the second type OFE.

As an alternatively to a single OFE with a 360-degree beam angle, the second type OFE comprises multiple sub-OFEs with each covering a part of the 360-degree beam angle. The plurality of sub-OFEs may be configured to operate in a synchronized manner, such that they are configured to send the first signal simultaneously. They may also be configured to receive at the same time.

The individual beam angles of the plurality of sub-OFE may be the same or different. It may also be possible that two adjacent sub-OFEs have a certain overlapping of the field-of-views. The individual beam angles of the sub-OFEs also represent a kind of angular resolution for detecting the response to the first signal from the optical AP. Typically, only a subset of the sub-OFEs can detect the response from the optical AP, which helps to reduce the search of the first type OFE for detecting the response. For example, the rotation of the first type OFE may be locked to the field-of-views covered by the subset of the sub-OFEs that have detected the response.

Beneficially, the local switch is configured to: select, when more than one sub-OFEs of the second type OFE detect the response to the first signal from the remote optical AP, a sub-OFE that detects the response with a better signal quality than others; and rotate the first type OFE for detecting the response within the beam angle of the selected sub-OFE of the second type OFE.

When two devices are better aligned, a higher signal strength will be detected by the receiving device. Therefore, when more than one sub-OFEs detect the same response, the one receives the response with a better signal quality also indicates that the sub-OFE is better aligned with the remote optical AP than the other sub-OFEs. It is thus beneficial to change the orientation of the first type OFE for a fine alignment only within the beam angle of the selected sub-OFE.

In a preferred example, upon detection of the response by the first type OFE and before fixation of the orientation of the first type OFE, the local switch is further configured to:

a) store a signal quality parameter of the detected response and a corresponding current orientation of the first type OFE;

b) continue to rotate the first type OFE to a new orientation to detect the response again;

c) repeat step a) and b) for a predefined number of times or until no response detected at another new orientation, and compare stored signal quality parameters to select a corresponding orientation with a best signal quality as the orientation to be fixed.

Depending on the tuning step of the first type OFE when rotating its orientation, the first type OFE may carry out a further fine alignment procedure after detecting the response for a first time. And then, around the orientation where it detects the response for the first time, the first type OFE may be further configured to rotate to detect the first response again, and to compare the signal quality parameters of the detections related to different orientations. Thus, the orientation related to a best signal quality can be fixed for data communication.

It may also be possible that the first type OFE initially employs a large tuning step in changing its orientation in a full range for detecting the response for a first time, as in a coarse tuning or acquisition procedure. In one example, the large tuning step may be comparable to the beam angle of the first type OFE. Upon detection of the response, the first type OFE may use a smaller tuning step in changing its orientation in a confined range for a fine alignment. The smaller tuning step may be a quarter of the large tuning step, or even smaller. And then, a proper alignment between the first type OFE and the remote optical AP may be achieved with a reduced latency.

In accordance with a second aspect of the invention an optical access point of a backbone network is provided for use in an optical wireless communication, OWC, system, the optical AP comprises: an optical front end, OFE, configured to transmit and/or receive with a beam angle not larger than 60 degrees, the OFE having an adjustable orientation for transmitting and/or receiving by rotating around a mechanical axis of the optical AP, wherein an angle between the mechanical axis and an optical beam axis of the OFE is greater than 0 degree but smaller than 180 degrees; wherein the optical AP is configured to: scan for the first signal from a remote local switch by rotating the orientation of the OFE around the mechanical axis; fix the orientation of the OFE, upon detecting the first signal, and send a response to the remote local switch with the OFE; and detect a confirmation signal from the remote local switch after fixing the orientation of the OFE.

An optical AP is used to connect between the backbone network and one or more end devices in an OWC system. To accommodate a flexible application scenario where the position of an optical AP may be changed quite frequently, such as in an industrial environment, the optical AP comprises a rotatable OFE such that the orientation of the OFE can be adjusted to align with different local switches in the surroundings.

An OFE comprises at least a light source and a light sensor, which implement the conversion between electrical signals and optical signals. In a transmitter chain, the OFE is used to convert an electrical transmitting signal to an output optical signal via the light source. In a receiver chain, the OFE is used to convert a received optical signal to an output electrical signal via the light sensor for further signal processing. A light source can be a Light-emitting diode (LED), a Laser diode (LD), a Vertical Cavity Surface Emitting Laser (VCSEL), or an array of LED, LD, or VESEL. A light sensor can be a photodiode, an avalanche diode, or another type of light sensor. Sometimes a light sensor is also called as a photo detector, a light detector, or a photo sensor.

To enable a high-speed connection between the optical AP and the local switch, the beam angle of the OFE is not larger than 60 degrees, preferably not larger than 30 degrees. Since a narrow point-to-point link is intended between the optical AP and the local switch for data communication, the beam angle of the first type OFE is preferably to be either 1 degree, 5 degrees, 10 degrees, 20 degrees, or 30 degrees. The selection of a beam angle may be dependent to the required data rate and communication distance. The higher the data rate or the larger the communication distance, the narrower the beam angle will be. In a preferred example, the OFE of the optical AP has a same beam angle as the first type OFE of the local switch. Beneficially, the OFE of the AP is of a same type as the first type OFE of the local switch.

The OFE is configured to rotate around a mechanical axis, and the angle between the mechanical axis and an optical beam axis of the OFE is greater than 0 degree but smaller than 180 degrees. In one example, the angle is of 90 degrees, such that the mechanical axis is perpendicular to an optical beam axis of the OFE. Therefore, the OFE may scan around the mechanical axis for a potential connection with a local switch. Such a procedure may be triggered whenever the position of the optical AP is changed, or a connection with a local switch is lost.

During a beam alignment procedure, the optical AP is configured to first scan for a first signal from a remote local switch by rotating the orientation of the OFE around the mechanical axis. In this scanning phase, a tuning step used to adjust the orientation of the OFE may be determined based on several factors, such as the size of the OFE beam angle, a latency requirement on the beam alignment, and an accuracy requirement on the beam alignment. Detection of the first signal with a certain orientation indicates that the optical AP and the local switch is aligned to a certain level. The optical AP will then fix the orientation of the OFE and send a response to the remote local switch. And then, the OFE is further configured to detect a confirmation signal from the remote local switch in the fixed orientation. The reception of the confirmation is used to indicate a successful alignment is accomplished.

Preferably, the response comprises an identifier of the optical AP.

There may be more than one optical AP in the direct communication range of the local switch. Thus, it is beneficial to indicate the identifier of the optical AP in the response signal, which also helps the local switch to distinguish different response signals from the more than one optical AP.

Beneficially, the response comprises an identifier of the remote local switch received in the first signal.

When the first signal carries an identification information of the remote local switch, the optical AP may also include that information in the response to make the response addressed to a certain local switch. This allows the optical AP to select locally when it receives the first signals from more than one candidate local switch. By indicating that the response is addressed to a first candidate local switch, it also avoids triggering the other candidate local switch to act on the response wrongly.

In one example, the response comprises a signal quality parameter of the detected first signal.

It may be beneficial to use the response to provide a feedback on the signal quality of the detected first signal to the local switch. Different parameters may be used to represent the signal quality of a received test signal, such as a received signal strength indicator (RSSI), a signal to noise ratio (SNR), a power spectrum density (PSD), and a bit error rate (BER).

Beneficially, the response comprises a current orientation of the OFE.

To assist a fine alignment between the optical AP and the remote local switch, the optical AP may also provide information on the orientation of the OFE when it detects the first signal. Such information may be even more beneficial if it is defined according to a common reference, such as measured with a compass comprised in the optical AP.

In a preferred example, upon detecting the first signal and before fixation the orientation of the OFE, the optical AP is further configured to:

a) store a signal quality parameter of the detected first signal and a corresponding current orientation of the OFE;

b) continue to rotate the OFE to a new orientation to detect the first signal again;

c) repeat step a) and b) for a predefined number of times or until no first signal detected at another new orientation, and compare stored signal quality parameters to select a corresponding orientation with a best signal quality as the orientation to be fixed.

Depending on the tuning step of the OFE when rotating its orientation, the OFE may carry out a further fine alignment procedure after detecting the first signal for a first time. And then, around the orientation where it detects the first signal for the first time, the OFE may be further configured to rotate with a smaller tuning step to detect the first signal again, and to compare the signal quality parameters of the detections related to different orientations. Thus, the orientation related to a best signal quality can be fixed for sending the response.

It may also be possible that the OFE initially employs a large tuning step in changing its orientation over its full range for detecting the first signal, as in a coarse tuning or acquisition procedure. In one example, the large tuning step may be comparable to the beam angle of the OFE. Upon detection of the first signal, the OFE may use a smaller tuning step in changing its orientation in a confined range for a fine alignment. The smaller tuning step may be a quarter of the large tuning step, or even smaller. And then, a better aligned orientation may be obtained by the optical AP with regard to the remote local switch.

In accordance with a third aspect of the invention a backbone network is provided. A backbone network for use in an optical wireless communication, OWC, system, the backbone network comprises: one or more local switches according to the present invention and one or more optical access points according to the present invention.

It may also be possible that a subset of the one or more local switches are further configured to carry out the functionality of an optical AP to provide optical wireless communication links to one or more end devices directly. Thus, each one of the subset of local switches may further comprise an OFE directing to an individual optical cell to be covered, in addition to a first type of OFE and a second type of OFE for establishing high speed connections with one or more optical APs in a horizontal plane for the backbone network.

Beneficially, the backbone network further comprises: a network controller communicatively coupled to the one or more local switches; wherein each local switch is further configured to forward information, obtained via the first type OFE and/or the second type OFE, about the one or more detected optical APs to the network controller; and the network controller is configured to: assign for each one of the one or more optical AP a respectively local switch according to the information collected; send one or more instructions correspondingly to one or more local switches respectively about the assignment.

With a plurality of local switches and optical APs deployed in the area, the pairing between local switches and optical APs may be optimized from a system level with the aid of a network controller. The network controller is communicatively coupled to the one or more local switches via a wired connection or a wireless connection. Since the communication between the network controller and the local switches is mainly used for exchanging control information, the data rate requirement on the communication is not critical. Each local switch may forward the information obtained via the first type OFE and/or the second type OFE in the response signals from an optical AP to the network controller. The information may comprise one or more out of: the identifier of the optical AP, the signal quality of the first signal and/or the response, the orientation of the optical AP.

Thus, the network controller may get a good overview of the performance with a potential pairing between a local switch and an optical AP. When there is more than one local switch in the direct communication range of the optical AP, the network controller may also assign the one that leads to a better connection to the optical AP, and send the instruction to that local switch accordingly. The local AP may send the confirmation via the first type OFE to the optical AP after it receives the instruction from the network controller. And then the paring between the local switch and the optical AP is also registered at the network controller side.

In accordance with a further aspect of the invention a method of a local switch is provided. A method carried out by a local switch of a backbone network for use in an optical wireless communication, OWC, system to provide a remote optical access point, AP, with a connection to an external network, wherein the local switch comprising a first type optical front end, OFE, for transmitting and/or receiving with a beam angle not larger than 60-degree and a second type OFE for transmitting and/or receiving with a 360-degree beam angle, the method comprises the local switch: sending a first signal with the second type OFE; detecting a response to the first signal from the remote optical AP with the second type OFE; rotating the orientation of the first type OFE, upon detecting the response by the second type OFE, for detecting the response with the first type OFE; fixing the orientation of the first type OFE, upon detecting the response by the first type OFE, and sending a confirmation signal to the remote optical AP with the first type OFE; wherein the first type OFE supports higher data rate communication than the second type OFE, and the first type OFE has an adjustable orientation for transmitting and/or receiving by rotating around a mechanical axis of the local switch, wherein an optical beam axis of the first type OFE is perpendicular to the mechanical axis, and the beam angle of the first type OFE is fully covered by the beam angle of the second type OFE.

In accordance with a further aspect of the invention a method of an optical access point is provided. A method carried out by an optical access point, AP, of a backbone network for use in an optical wireless communication, OWC, system, wherein the optical AP comprising an optical front end, OFE, for transmitting and/or receiving with a beam angle not larger than 60 degrees; the method comprises the optical AP: scanning for a first signal from a remote local switch by rotating the orientation of the OFE around the mechanical axis; fixing the orientation of the OFE, upon detecting the first signal, and sending a response to the remote local switch with the OFE; and detecting a confirmation signal from the remote local switch after fixing the orientation of the OFE.

The invention may further be embodied in a computing program comprising code means which, when the program is executed by a local switch comprising processing means, cause the processing means to perform the method of the local switch as disclosed in the present invention.

The invention may further be embodied in a computing program comprising code means which, when the program is executed by an optical access point comprising processing means, cause the processing means to perform the method of the optical access point as disclosed in the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

The embodiments set forth below represent information to enable those skilled in the art to practice the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure.

Figures 1, 2:
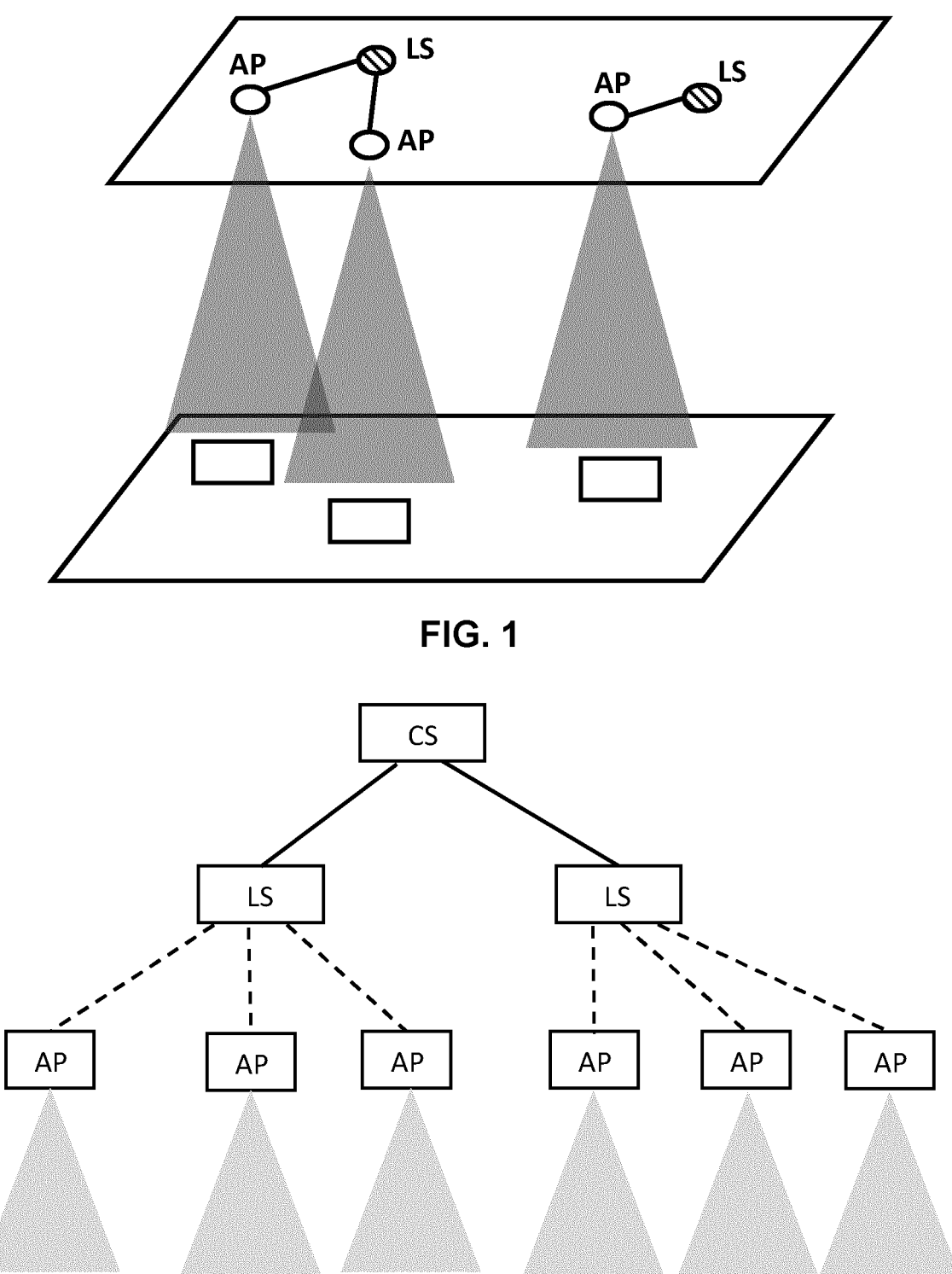
FIG. 1 demonstrates a deployment of a backbone network for OWC in an industrial environment.
FIG. 2 illustrates one example of tree topology of a backbone network for OWC.

In an industrial environment, it is highly desirable that a backbone network is deployed with a high flexibility, given that the Access Points (APs) may be repositioned frequently. Thus, APs 300 are preferably equipped with mainly or purely wireless air interfaces. On the one hand, APs are connected to the backbone wirelessly, and on the other hand APs provide wireless connection to one or more end/user devices or equipment. The connection between APs and the one or more end/user devices or equipment may be based on 5G cellular, Wi-Fi, or LiFi technologies. However, considering the metallic surroundings in the industrial environment, OWC or LiFi is preferable over radio frequency based wireless communication, such as 5G cellular and Wi-Fi. FIG. 1 demonstrates a deployment of a backbone network 100 for OWC in an industrial environment. The plurality of APs are connected to one or more local switches (LS) to the backbone.

Since the backbone network connects a plurality of APs, the backbone network may be deployed in different topologies, such as a mesh topology, a tree topology, or a star topology. In the mesh topology, the plurality of APs is connected in a distributed manner. In the star topology, the plurality of APs is connected to a central switching (CS) node. In the tree topology, the plurality of APs is connected respectively to one or more local switching (LS) nodes, and the one or more local switching nodes are connected to the central switch (CS) node. The central switch and the plurality of local switches are typically located on fixed positions and are connected with wired connections. FIG. 2 illustrates a system architecture of an OWC backbone network with the tree topology, where the coverage areas of individual OWC APs are illustrated by shaded triangles. Given the Line-of-sight property of OWC, an end device is able to communicate with an AP only when it is in the coverage area of that AP.

Figure 3:
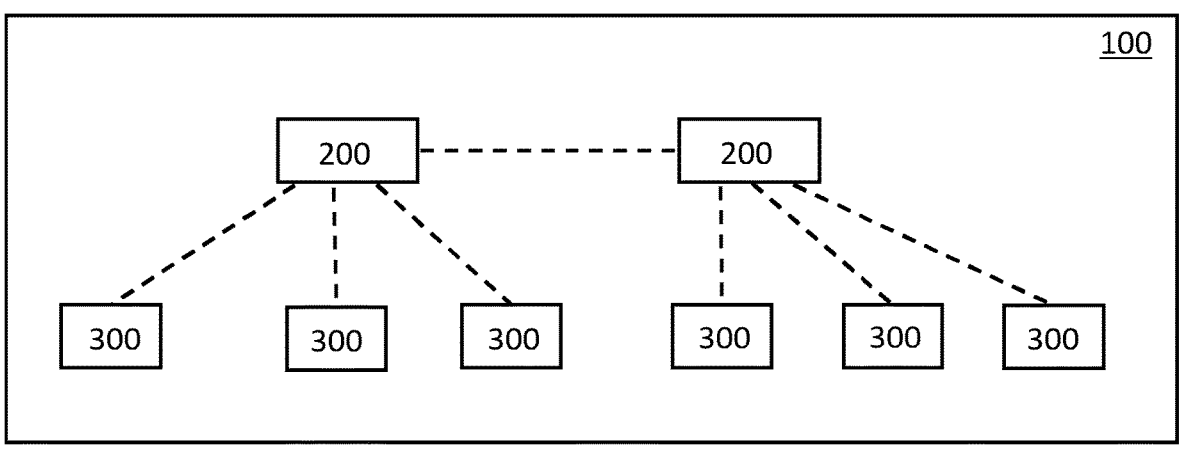
FIG. 3 illustrates one possible system architecture of the backbone network.
Figure 4:
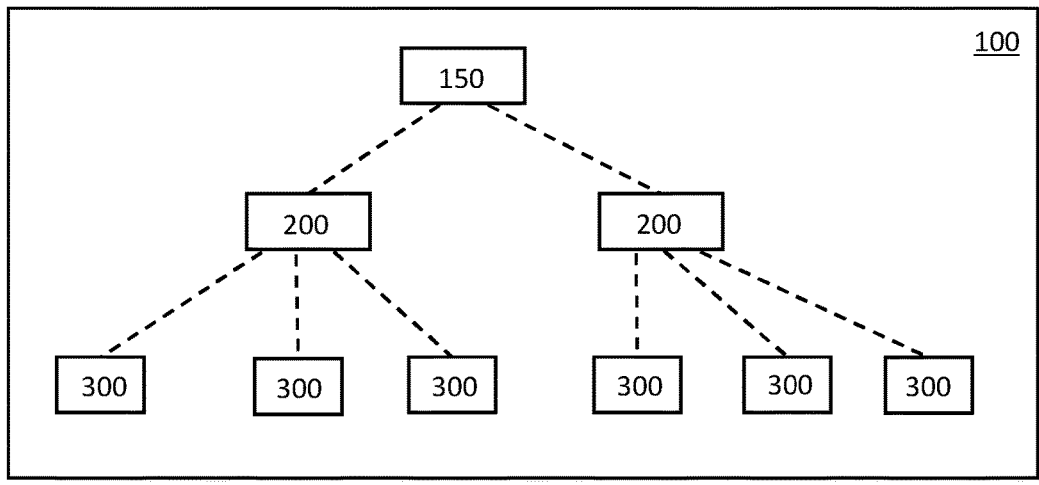
FIG. 4 illustrates one possible system architecture of the backbone network.

FIG. 3 and FIG. 4 illustrate two possible options to deploy the backbone network 100. In FIG. 3, there are one or more local switches 200 deployed in the backbone network 100, with each local switch 200 provides connection to one or more optical APs 300. When there are more than one local switch 200, the connection between the more than one local switches 200 is based on a mesh topology. Such a system may be deployed in a flexible manner. The link between two local switches may be optical wireless links when the distance between two neighbouring local switches is relatively short and a line-of-sight connection will be possible in many situations between neighbouring local switches. It may be possible to realise a mesh network connecting all local switches with wireless optical links. FIG. 4 shows an alternative system architecture, where the backbone network 100 is organized according to a tree topology. The more than one local switch 200 is not connected on a peer-to-pee basis but are connected to a central switch 150 in a centralized manner. The selection between the two potential architectures may be made depending on the available infrastructure of the system. In this architecture, the connection between central switch and local switches is typically based on a wired connection. The central switch may be positioned such that not all local switches can have a line-of-sight connection with the central switch.

Note that the local switch and the optical AP as disclosed in the present invention may be understood as a first type of nodes and a second type of nodes, respectively. Thus, it may also be possible that a subset of the one or more local switches 200, or first type of nodes, are further configured to carry out the functionality of an optical AP to provide optical wireless communication links to one or more end devices directly. Thus, a first type of node may further comprise an OFE directing to an individual optical cell to be covered, in addition to a first type of OFE and a second type of OFE for establishing high speed connections with one or more optical APs in a horizontal plane for the backbone network.

Figure 5:
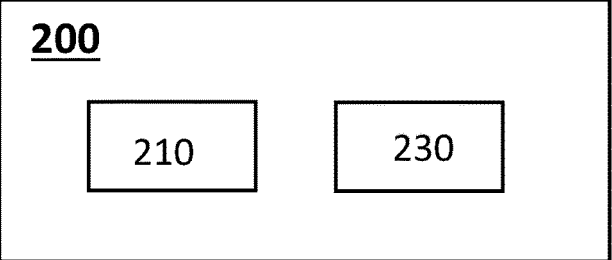
FIG. 5 illustrates a basic block diagram of a local switch.

FIG. 5 illustrates a basic block diagram of a local switch 200. In this exemplary setup, the local switch 200 comprises a first type OFE 210 and a second type OFE 230. The first type OFE 210 has a relatively narrow beam angle but an adjustable orientation, which is mainly used for establishing a data link between the local switch 200 and an AP. The second type OFE 230 has a 360-degree beam angle on the rotation plane of the first type OFE 210 that covers all the potential field of views (FoVs) of the first type OFE 210. The second type of OFE 230 is mainly used for acquisition and possibly coarse alignment between the local switch 200 and the AP.

Since it may be desirable that the local switch 200 could provide high-speed links to more than one optical AP 300 concurrently, the local switch 200 may preferably comprise more than one first type OFE 210. Upon detection of responses to the first signal from the more than one optical AP 300 respectively, each one of the more than one first type OFE 210 may be controlled individually according to the present invention. Thus, the more than one first type OFE 210 may be fixed to different orientations for communicating with different optical APs 300 respectively. It may also be possible that depending on the number of optical APs 300 in the surroundings, a subset of the more than one first type OFEs 210 are activated at the same time.

Note that beam angle or FoV here is understood to be the solid angle originating from the light source in three-dimensional space, where light from the light source may be perceived. The shape of the solid angle may be shaped using further optical means, such as but not limited to lenses, gratings, diaphragms and/or collimators. Another term used in conjunction with the light source is coverage area, coverage area is understood as the area in the three-dimensional space that light from the light-source impinges on.

The local switch 200 may further comprise a mechanical steering means or an actuator, which is used to excite the rotation of the first type OFE 210.

Figure 6:
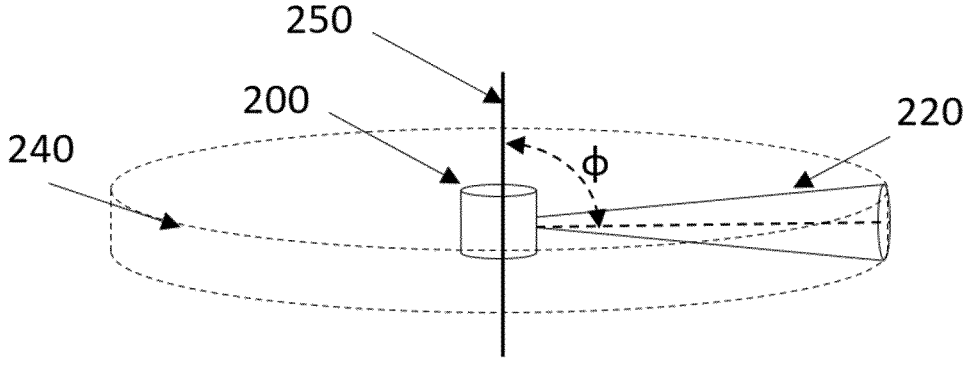
FIG. 6 demonstrates the field-of-views of the first type OFE and the second type OFE of a local switch.

FIG. 6 provides an illustration of the FoVs of the first type OFE 210 and the second type OFE 230 of a local switch 200. The first type OFE 210 has a beam angle 220 not larger than 60 degrees, preferably less than 30 degrees. In order to allow flexibility in beam alignment, the first type OFE has an adjustable orientation for transmitting and receiving by rotating around a mechanical axis 250 of the local switch 200, the angle φ between the mechanical axis and an optical beam axis of the first type OFE is greater than 0 degree but smaller than 180 degrees. In one example, the angle φ is of 90 degrees, such that the mechanical axis of the local switch is perpendicular to the plane where the rotation angle of the first type OFE is located.

The second type OFE 230 has a 360-degree beam angle 240 on the rotation plane of the first type OFE 210, which is intended to provide a full coverage for both emitting data to a potential AP and capturing data from the potential AP. The first type OFE 210 and the second type OFE 230 are placed in such a way that the beam angle 220 of the first type OFE 210 is fully covered by the beam angle 240 of the second type OFE 230 with each possible orientation of the first type OFE 210.

Note that it may also be possible that the second type OFE 230 is not a single OFE but comprises multiple sub-OFEs with each covering a part of the 360-degree beam angle. It may also be possible that two adjacent sub-OFEs have a certain overlapping of the field-of-views. The plurality of sub-OFEs is configured to operate in a synchronized manner, such that they are configured to send the first signal simultaneously.

The individual beam angles of the plurality of sub-OFE may be the same or different. The individual beam angles of the sub-OFEs also represent a kind of angular resolution, as known from angular diversity receivers, for detecting the response to the first signal from the optical AP 300. Typically, only a subset of the sub-OFEs can detect the response from the optical AP, which helps to reduce the search of the first type OFE for detecting the response. For example, the rotation of the first type OFE may be locked to the field-of-views covered by the subset of the sub-OFEs that have detected the response.

In one example, when more than one sub-OFEs of the second type OFE 230 detect the response to the first signal from the remote optical AP 300, the local switch 200 may select a sub-OFE that detects the response with a better signal quality than others, which indicates a better alignment between that sub-OFE of the second type OFE 230 and the remote optical AP 300. And then, it is beneficial to rotate the first type OFE 210 to the orientation within the beam angle of the selected sub-OFE of the second type OFE 230, for detecting a response from the remote optical AP 300.

Depending on the beam angle size of the first type OFE 210 and the tuning step when rotating the first type OFE 210, a fine-tuning stage may be used by the local switch 200. Upon detection of the response by the first type OFE 210, the orientation of the first type OFE 210 is not fixed immediately. Instead, the local switch 200 may carry out the following steps to further improve the alignment between the first type OFE 210 and the remote optical AP 300. Instead of fixing the orientation of the first type OFE 210 immediately, the local switch 200 a) store a signal quality parameter of the detected response and a corresponding current orientation of the first type OFE 210;

b) continue to rotate the first type OFE 210 to a new orientation, around the orientation where it can still detect the response, to detect the response again;

c) repeat step a) and b) for a predefined number of times or until no response detected at another new orientation, and compare stored signal quality parameters to select a corresponding orientation with a best signal quality as the orientation to be fixed.

Thus, the orientation related to a best signal quality might be located and fixed for data communication. In order to reduce the latency in searching such an optimal alignment, it is beneficial that the first type OFE 210 initially employs a large tuning step in changing its orientation in a full range for detecting the response for a first time, as in a coarse tuning or acquisition procedure. In one example, the large tuning step may be comparable to the beam angle of the first type OFE. Upon detection of the response, the first type OFE 210 may use a smaller tuning step in changing its orientation in a confined range for a fine alignment. The smaller tuning step may be a quarter of the large tuning step, or even smaller. And then, a proper alignment between the first type OFE 210 and the remote optical AP 300 may be achieved with a reduced latency.

After the first type OFE 210 and the remote optical AP 300 establish a high-speed communication link after the beam alignment, the second type OFE 230 may continue to send the first signal occasionally or periodically when the local switch comprises a further first type OFE 210 without a high-speed data link established. Thus, a new alignment procedure may be triggered for the further first type OFE 210 and another remote optical AP 300 in the surrounding. Note that it may also be possible that after sending a first signal by the second type OFE 230, responses from more than one remote optical AP 300 are received by the second type OFE 230. And then, more than one first type OFE 210 of the local switch 200 may be rotated individually align with different optical APs 300 respectively.

Figure 7:
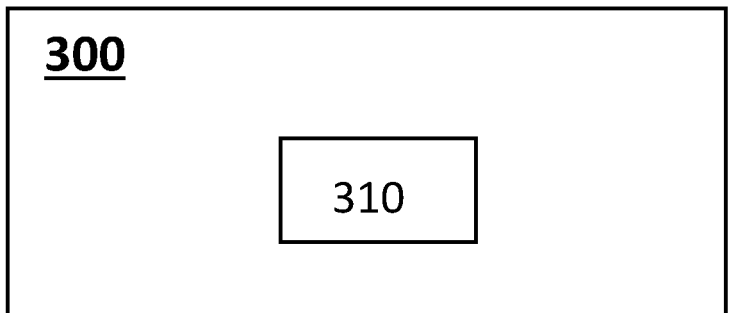
FIG. 7 illustrates a basic block diagram of an optical AP.

FIG. 7 illustrates a basic block diagram of an optical AP 300. The optical AP 300 comprises at least an OFE 310, which is configured to establish a high speed OWC link with a local switch. The OFE 310 has a rotatable orientation with a beam angle not larger than 60 degrees. The optical AP 300 may further comprise a mechanical steering means or an actuator, which is used to excite the rotation of the OFE 310 in a horizontal plane in parallel to a floor space. The OFE 310 is used to establish a high-speed link with a local switch, as part of a backbone network.

The optical AP 300 may further comprise another OFE (not shown in the figure) for establishing a bi-directional OWC link with an end device located in the coverage area of the optical AP 300. To achieve a large coverage area of an optical cell, the other OFE may have a wider beam angle as compared to the OFE 310. When the AP 300 is mounted on the ceiling or suspended from the ceiling, it may be directed to a floor-space defining the AP 300's coverage area.

Figure 8:
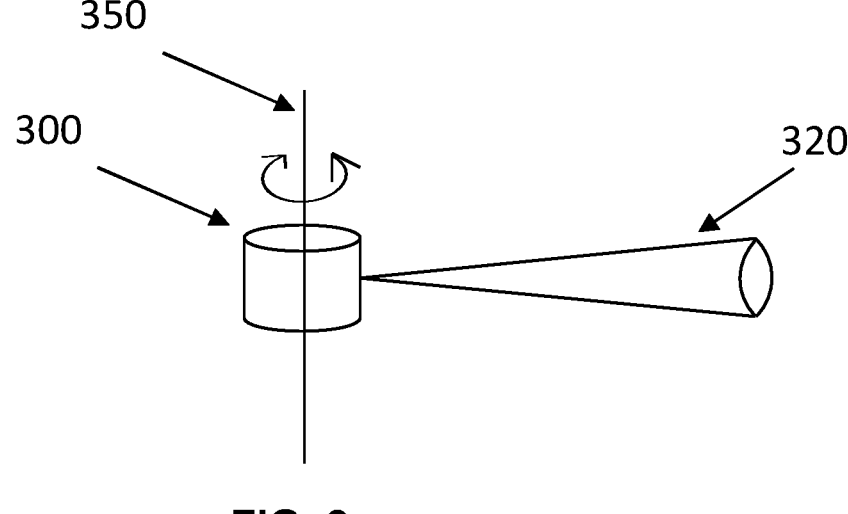
FIG. 8 demonstrates the field-of-view of the OFE of an optical AP.

FIG. 8 demonstrates the FoV of the OFE 310 of the optical AP 300. With a beam angle 320 not larger than 60 degrees, the OFE 310 has an adjustable orientation for transmitting and/or receiving by rotating around a mechanical axis 350 of the optical AP 300, wherein an angle $\Psi$ between the mechanical axis 350 and an optical beam axis of the OFE 310 is greater than 0 degree but smaller than 180 degrees. In one example, the angle $\Psi$ is of 90 degrees, such that the mechanical axis 350 is perpendicular to the optical beam axis of the OFE 310.

The beam angle 320 may be dimensioned substantially narrower than 60 degrees, thereby focusing the light output in a narrower beam angle, in the range of as 45-15, or 30-15 degrees, or less than 10 degrees, thereby substantially reducing the transmit power requirement to achieve the same photon density at the APs sensors. Narrower beam angles may be particularly useful when the Local Switches and Access Points are mounted at the same or a similar height. A narrower beam requires more accurate alignment, which for a reconfigurable backbone where the APs are stationary between reconfigurations may be perfectly acceptable. A similar approach may be used for the OFE of the AP. During a beam alignment procedure, the optical AP 300 is configured to first scan for a first signal from a remote local switch by rotating the orientation of the OFE 310 around the mechanical axis 350. In this scanning phase, a tuning step used to adjust the orientation of the OFE 310 may be determined based on several factors, such as the size of the OFE beam angle, a latency requirement on the beam alignment, and an accuracy requirement on the beam alignment. Typically, the larger the beam angle of the OFE 310, the larger the tuning step may be used to change the orientation of the OFE 310.

Detection of the first signal with a certain orientation indicates that the optical AP 300 and the local switch 200 is aligned to a certain level, or there is an overlap between the coverage of the local switch 200 and the FoV of the optical AP 300. The optical AP 300 will then fix the orientation of the OFE 310 and send a response to the remote local switch 200. And then, the OFE 310 is further configured to detect a confirmation signal from the remote local switch 200 in the fixed orientation. The reception of the confirmation signal from the remote local switch 200 is used to indicate a successful alignment is accomplished.

Considering that the remote local switch 200 may be configured to establish a high-speed link with more than one optical APs, the optical AP 300 may specify its own identifier in the response to the remote local switch 200.

It may also be possible that the optical AP 300 is in the coverage of more than one remote local switches, such that the optical AP 300 receives first signals from more than one remote local switch. Beneficially, the optical AP 300 may respond to the first signal that is of a better received signal quality. And even more beneficially, the optical AP 300 may indicate in the response signal the identification information of the remote local switch from which the first signal is of a better received signal quality. Thus, the other one or more local switches will not be triggered to send further confirmation signal.

To further assist the beam alignment procedure, the optical AP 300 may optionally provide a feedback on the signal quality of the detected first signal in the response sent to the local switch. Different parameters may be used to represent the signal quality of a received test signal, such as a received signal strength indicator (RSSI), a signal to noise ratio (SNR), a power spectrum density (PSD), and a bit error rate (BER).

In another option, the optical AP 300 may also provide information on the orientation of the OFE 310 when it detects the first signal to assist a fine alignment between the optical AP 300 and the remote local switch 200. Such information may be even more beneficial if it is defined according to a common reference, such as measured with a compass comprised in the optical AP 300.

Figure 9:
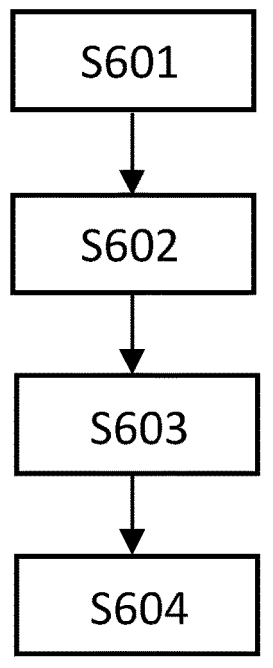
FIG. 9 shows a flow chart of a method of the local switch.

FIG. 9 shows a flow chart of a method 600 of the local switch 200 for use in an OWC system to provide a remote optical access point 300 with a connection to an external network. The local switch 200 comprises a first type optical front end, OFE, 210 for transmitting and/or receiving with a beam angle 220 not larger than 60-degree and a second type OFE 230 for transmitting and/or receiving with a 360-degree beam angle on the rotation plane of the first type OFE 210. The method 600 comprises the local switch 200: in step S601, sending a first signal with the second type OFE 230; then, detecting, in step S602, a response to the first signal from the remote optical AP 300 with the second type OFE 230; in step S603, upon detecting the response by the second type OFE 230, rotating the orientation of the first type OFE 210 for detecting the response with the first type OFE 210; and in step S604, upon detecting the response by the first type OFE 210, fixing the orientation of the first type OFE 210, and sending a confirmation signal to the remote optical AP 300 with the first type OFE 210. The first type OFE 210 supports higher data rate communication than the second type OFE 230, and the first type OFE 210 has an adjustable orientation for transmitting and/or receiving by rotating around a mechanical axis of the local switch 200, wherein an angle between the mechanical axis and an optical beam axis of the first type OFE 210 is greater than 0 degree but smaller than 180 degrees, and the beam angle of the first type OFE 210 is fully covered by the beam angle of the second type OFE 230.

Figure 10:
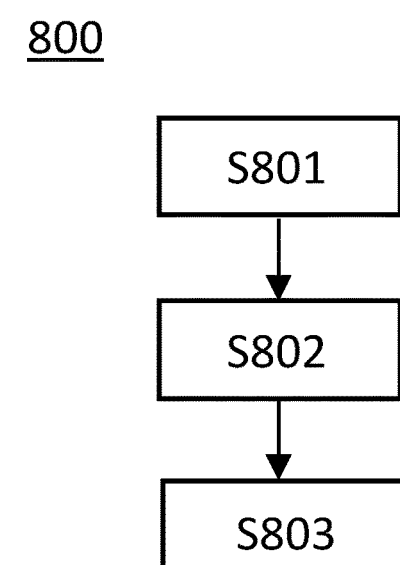
FIG. 10 shows a flow chart of a method of the optical AP.

FIG. 10 shows a flow chart of a method 800 of the optical AP 300. The optical AP 300 comprising an optical front end 310, OFE, for transmitting and/or receiving with a beam angle 320 not larger than 60 degrees. The method 800 comprises the optical AP 300: in step S801, scanning for a first signal from a remote local switch 200 by rotating the orientation of the OFE 310 around the mechanical axis 350; and in step S802, fixing the orientation of the OFE 310, upon detecting the first signal, and sending a response to the remote local switch 200 with the OFE 310; and in step S803, detecting a confirmation signal from the remote local switch 200 after fixing the orientation of the OFE 310.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The invention claimed is:

1. A backbone network for use in an optical wireless communication, OWC, system, the backbone network comprising:
    one or more local switches configured to provide to one or more optical access points, APs, connections to an external network, each local switch comprising:
        a first type optical front end, OFE, configured to transmit and/or receive with a beam angle not larger than 60 degrees, the first type OFE having an adjustable orientation for transmitting and/or receiving by rotating around a mechanical axis of a respective local switch, wherein an angle between the mechanical axis and an optical beam axis of the first type OFE is greater than 0 degree but smaller than 180 degrees; and
        a second type OFE configured to transmit and/or receive with a 360-degree beam angle on the rotation plane of the first type OFE; wherein the first type OFE supports higher data rate communication than the second type OFE, and the beam angle of the first type OFE is fully covered by the beam angle of the second type OFE;
    wherein each local switch is configured to:
        send a first signal with the second type OFE;
        detect a response to the first signal from a remote optical AP with the second type OFE;
        rotate the first type OFE, upon detecting the response by the second type OFE, for detecting the response with the first type OFE;

fix the orientation of the first type OFE, upon detecting the response by the first type OFE, and send a confirmation signal to the remote optical AP with the first type OFE; and
    one or more optical APs each comprising:
        an optical front end, OFE, configured to transmit and/or receive with a beam angle not larger than 60 degrees, the OFE-having an adjustable orientation for transmitting and/or receiving by rotating around a mechanical axis of a respective optical AP, wherein an angle between the mechanical axis of the respective optical AP and an optical beam axis of the OFE is greater than 0 degree but smaller than 180 degrees;
    wherein each optical AP is configured to:
        scan for the first signal from the remote local switch by rotating the orientation of the OFE around the mechanical axis;
        fix the orientation of the OFE, upon detecting the first signal, and send a response to the remote local switch with the OFE; and
        detect a confirmation signal from the remote local switch after fixing the orientation of the OFE.

2. The backbone network of claim 1, the backbone network further comprising:
    a network controller communicatively coupled to the one or more local switches;
    wherein each local switch is further configured to forward information, obtained via the first type OFE and/or the second type OFE, about the one or more detected optical APs to the network controller; and the network controller is configured to:
    assign for each one of the one or more optical APs a respectively local switch according to the information collected;
    send one or more instructions correspondingly to one or more local switches respectively about the assignment.

3. The backbone network of claim 1, wherein the response from an optical AP out of the one or more optical APs comprises an identifier of the optical AP.

4. The backbone network of claim 1, wherein the response from an optical AP out of the one or more optical APs comprises an identifier of the remote local switch received in the first signal.

5. The backbone network of claim 1, wherein the response from an optical AP out of the one or more optical APs comprises a signal quality parameter of the detected first signal.

6. The backbone network of claim 1, wherein the response from an optical AP out of the one or more optical APs comprises a current orientation of the OFE.

7. The backbone network of claim 1, wherein, upon detecting the first signal and before fixing the orientation of the OFE, each optical AP is further configured to:
    a) store a signal quality parameter of the detected first signal and a corresponding current orientation of the OFE;
    b) continue to rotate the OFE to a new orientation to detect the first signal again;
    c) repeat step a) and b) for a predefined number of times or until no first signal detected at another new orientation, and compare stored signal quality parameters to select a corresponding orientation with a best signal quality as the orientation to be fixed.

8. A local switch of a backbone network for use in an optical wireless communication, OWC, system, the local switch configured to provide to a remote optical access point, AP, a connection to an external network, the local switch comprising:

a first type optical front end, OFE, configured to transmit and/or receive with a beam angle not larger than 60 degrees, the first type OFE having an adjustable orientation for transmitting and/or receiving by rotating around a mechanical axis of the local switch, wherein an angle between the mechanical axis and an optical beam axis of the first type OFE is greater than 0 degree but smaller than 180 degrees; and a second type OFE configured to transmit and/or receive with a 360-degree beam angle on the rotation plane of the first type OFE; wherein the first type OFE supports higher data rate communication than the second type OFE, and the beam angle of the first type OFE is fully covered by the beam angle of the second type OFE;

wherein each local switch is configured to:

send a first signal with the second type OFE;

detect a response to the first signal from a remote optical AP with the second type OFE;

rotate the first type OFE, upon detecting the response by the second type OFE, for detecting the response with the first type OFE; and fix the orientation of the first type OFE, upon detecting the response by the first type OFE, and send a confirmation signal to the remote optical AP with the first type OFE.

9. The local switch of claim 8, wherein the first signal comprises an identifier of the local switch.

10. The local switch of claim 8, wherein the second type OFE comprises a plurality of sub-OFEs, each having a different orientation with an individual beam angle, and the combined individual beam angles constitute the 360-degree beam angle of the second type OFE.

11. The local switch of claim 10, wherein the local switch is configured to:

select, when more than one sub-OFEs of the second type OFE detect the response to the first signal from the remote optical AP, a sub-OFE that detects the response with a better signal quality than others; and rotate the first type OFE for detecting the response within the beam angle of the selected sub-OFE of the second type OFE.

12. The local switch of claim 8, wherein, upon detection of the response by the first type OFE and before fixation of the orientation of the first type OFE, the local switch is further configured to:

a) store a signal quality parameter of the detected response and a corresponding current orientation of the first type OFE;

b) continue to rotate the first type OFE to a new orientation to detect the response again;

c) repeat step a) and b) for a predefined number of times or until no response detected at another new orientation, and compare stored signal quality parameters to select a corresponding orientation with a best signal quality as the orientation to be fixed.

13. A method carried out by a local switch of a backbone network for use in an optical wireless communication, OWC, system to provide a remote optical access point, AP, with a connection to an external network, wherein the local switch comprising a first type optical front end, OFE, for transmitting and/or receiving with a beam angle not larger than 60-degree and a second type OFE for transmitting and/or receiving with a 360-degree beam angle; the method comprising the local switch:

sending a first signal with the second type OFE;

detecting a response to the first signal from the remote optical AP with the second type OFE;

rotating the orientation of the first type OFE, upon detecting the response by the second type OFE, for detecting the response with the first type OFE;

fixing the orientation of the first type OFE, upon detecting the response by the first type OFE, and sending a confirmation signal to the remote optical AP with the first type OFE;

wherein the first type OFE-supports higher data rate communication than the second type OFE, and the first type OFE has an adjustable orientation for transmitting and/or receiving by rotating around a mechanical axis of the local switch, wherein an angle between the mechanical axis and an optical beam axis of the first type OFE is greater than 0 degree but smaller than 180 degrees, and the beam angle of the first type OFE is fully covered by the beam angle of the second type OFE.

14. A non-transitory computing readable medium comprising instructions which, when the instructions are executed by a local switch cause the local switch to perform the method of claim 13.

* * * * *